(12) United States Patent
Davis et al.

(10) Patent No.: US 6,215,565 B1
(45) Date of Patent: Apr. 10, 2001

(54) METHOD OF AND SYSTEM FOR DIAGNOSING OPTICAL SYSTEM FAILURES

(75) Inventors: Gary B. Davis, Rowlett; John Fee; Shoa-Kai Liu, both of Richardson, all of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/123,088

(22) Filed: Jul. 27, 1998

(51) Int. Cl.[7] ................................................. H04B 10/08
(52) U.S. Cl. .................... 359/110; 359/124; 359/134; 359/127; 359/128; 359/130; 359/133
(58) Field of Search ............................. 359/110, 124–134

(56) References Cited

U.S. PATENT DOCUMENTS

| | | | | |
|---|---|---|---|---|
| 5,513,029 | * | 4/1996 | Roberts | 359/177 |
| 5,654,816 | * | 8/1997 | Fishman | 359/177 |
| 5,943,147 | * | 8/1999 | Vanoli et al. | 359/110 |
| 5,963,312 | * | 10/1999 | Roberts | 356/73.1 |
| 5,986,782 | * | 11/1999 | Alexander et al. | 359/110 |
| 6,008,916 | * | 12/1999 | Khaleghi | 359/110 |
| 6,108,113 | * | 8/2000 | Fee | 359/124 |
| 6,115,157 | * | 9/2000 | Barnard et al. | 359/124 |

* cited by examiner

*Primary Examiner*—Leslie Pascal
*Assistant Examiner*—Hanh Phan

(57) ABSTRACT

A method of monitoring performance of an optical communications system measures (i) sub-carrier signal-to-noise ratio, (ii) optical signal signal-to-noise ratio, and (iii) measuring optical signal bit error rate, and diagnoses a system component failure based upon measured sub-carrier signal-to-noise ratio, optical signal signal-to-noise ratio, and optical signal bit error rate.

20 Claims, 3 Drawing Sheets

| SUBCARRIER SNR | SONET BER | OPTICAL SIGNAL SNR | IMPLIED FAILURE SCENARIO |
|---|---|---|---|
| NORMAL | NORMAL | DEGRADED/BAD | OPM FAULTY OR TUNED TO A DIFFERENT WAVELENGTH |
| NORMAL | DEGRADED/BAD | NORMAL | LTE SIGNAL FAILURE AT RECEIVER |
| NORMAL | DEGRADED/BAD | DEGRADED/BAD | 1. AMPLIFIER PUMP LASER DEGRADED. 2. OTHER CARRIERS ADDED TO AN AMPLIFIED LINE. 3. MIXING PRODUCT ROBBING POWER. 4. OCCS RESTORATION. 5. INCREASED INPUT ISOLATOR ATTENUATION. 6. STIMULATED RAMAN SCATTERING. 7. ONE CARRIER FAILS IN A COMMON SUBCARRIER TECHNIQUE. |

FIG. 2A

| SUBCARRIER SNR | SONET BER | OPTICAL SIGNAL SNR | IMPLIED FAILURE SCENARIO |
|---|---|---|---|
| DEGRADED/BAD | NORMAL | NORMAL | 1. FAULTY SC TX OR RX.<br>2. NON-LINEAR OR SATURABLE ELEMENT IN PATH. |
| DEGRADED/BAD | NORMAL | DEGRADED/BAD | COMBINED SC AND OPM FAILURE. |
| DEGRADED/BAD | DEGRADED/BAD | NORMAL | COMBINED LTE AND SC RX FAILURE. |
| DEGRADED/BAD | DEGRADED/BAD | DEGRADED/BAD | 1. REDUCED TRANSMITTER LASER POWER.<br>2. LOS TO AMPLIFIER INPUT.<br>3. OPERATOR ERROR BY PRE-EMPHASIZING TX. |

FIG. 2B

METHOD OF AND SYSTEM FOR DIAGNOSING OPTICAL SYSTEM FAILURES

FIELD OF THE INVENTION

The present invention relates generally to optical communications system operation and management, and more particularly to a method of and system for detecting and diagnosing faults in an optical communications system.

DESCRIPTION OF THE PRIOR ART

Optical fiber systems have become the physical transport medium of choice in long distance telephone and data communication networks. The original optical fiber systems included, in addition to a light transmitter and a light receiver connected by optical fiber, repeaters at various points along the optical fiber. Repeaters are optical-electrical devices that include a receiver and a transmitter in series with circuitry for reshaping and retiming the signal. The receiver part of the repeater converts the signal on the optical fiber from the optical domain to the electrical domain, and the transmitter converts the signal from the electrical domain back to the optical domain. The retiming and reshaping circuitry processes the signal in the electrical domain prior to retransmission.

Repeaters also include various fault detection circuitry. Whenever the fault detection circuitry of a repeater detects a loss of signal, which may be caused by a break in the fiber, the repeater generates an alarm indication signal (AIS), which is passed downstream from repeater to repeater to a controller. The controller can identify the repeater that originated the AIS and thereby determine the approximate location of the fiber break. Recently, optical network operators have proposed and have begun to introduce "all-optical" systems. An all-optical system does not include electro-optical repeaters. Rather, all-optical systems use optical amplifiers, such as rare earth-doped fiber amplifiers, to amplify the optical signals along the route.

In a communications network implemented with electro-optical equipment, failure detection and location is relatively easy to accomplish. In transit, the data-bearing signals are handled by numerous transmitters, receivers, amplifiers, multiplexers, and other equipment, any of which can readily recognize the absence of a valid signal and generate an alarm.

Some of the main advantages driving the implementation of all-optical networks are larger capacity links, path transparency regardless of bit rate and format, and more efficient switching of large bandwidth paths. In implementing an all-optical network, the detection and location of failure conditions is complicated because the data modulating the optical carrier is no longer readily available in the form of an electrical signal. To install equipment that transduces and decodes the high bit rate data stream defeats some of the principal advantages of an all-optical approach.

In patent application Ser. No. 08/582,845, filed Dec. 29, 1995 (Docket No. RIC-95-137), there is disclosed a technique for superimposing a low-level, low-frequency modulation onto the optical carrier along with the high bit rate data signal. An inexpensive photo detector can be used anywhere along the optical path to tap a small fraction of the optical carrier power and extract the low-level subcarrier without having to transduce and decode the high bit rate signal. This subcarrier can serve as a pilot tone to allow for a simple and reliable optical continuity indicator. However, the subcarrier technique alone cannot distinguish between the failure of an optical fiber, a transmitter, or a line amplifier. There has been proposed an optical performance monitor (OPM), which is a device that can monitor an optical line and measure such parameters as optical power, wavelength, and optical signal-to-noise ratio. However, the optical performance monitor cannot distinguish some types of failures.

SUMMARY OF THE INVENTION

The present invention provides a method monitoring performance of an optical communications system by measuring (i) sub-carrier signal-to-noise ratio, (ii) optical signal signal-to-noise ratio, and (iii) measuring optical signal bit error rate. The method diagnoses a system component failure based upon measured sub-carrier signal-to-noise ratio, optical signal signal-to-noise ratio, and optical signal bit error rate. Preferably, the method diagnoses a system component failure by consulting a component failure table.

According to the present invention, if the optical signal signal-to-noise ratio is degraded and both the subcarrier signal-to-noise ratio and the optical signal bit error rate are normal, then there is a failure of an optical signal signal-to-noise ratio test device. If the optical signal bit error rate is degraded and both the subcarrier signal-to-noise ratio and the optical signal signal-to-noise ratio are normal, then there is an optical signal failure at a receiver. If the subcarrier signal-to-noise ratio is normal and both the optical signal signal-to-noise ratio and the optical signal bit error rate are degraded, then the possible failures are a degraded amplifier pump laser, a presence of other carriers added to an amplified line, a robbing of amplifier power by the presence of mixing products, an optical cross-connect restoration, an increase in amplifier input isolator attenuation, a presence of stimulated Raman scattering, or a failure of a carrier in a common subcarrier technique.

If the subcarrier signal-to-noise ratio is degraded and both the optical signal signal-to-noise ratio and the optical signal bit error rate are normal, then there is either a faulty subcarrier transmitter, a faulty subcarrier receiver, or a non-linear element or saturable element in the system. If the optical signal bit error rate is normal and both the optical signal signal-to-noise ratio and the subcarrier signal-to-noise ratio are degraded, there is a combined subcarrier and optical signal signal-to-noise ratio test device failure. If the optical signal signal-to-noise ratio is normal and both the subcarrier signal-to-noise ratio and the optical signal bit error rate are degraded, there is a combined failure of both the optical signal receiver and the subcarrier receiver. If the subcarrier signal-to-noise ratio, the optical signal signal-to-noise ratio, and the optical signal bit error rate are all degraded, then there is either a reduction in transmitter laser power, a loss of signal at an amplifier input, or an operator error by pre-emphasizing a transmitter.

BRIEF DESCRIPTION OF THE DRAWINGS

FIGS. 2A and 2B comprise a component failure table mapping performance parameter observations into possible causes of failures according to the present invention.

DESCRIPTION OF THE PREFERRED EMBODIMENT

Figure 1:
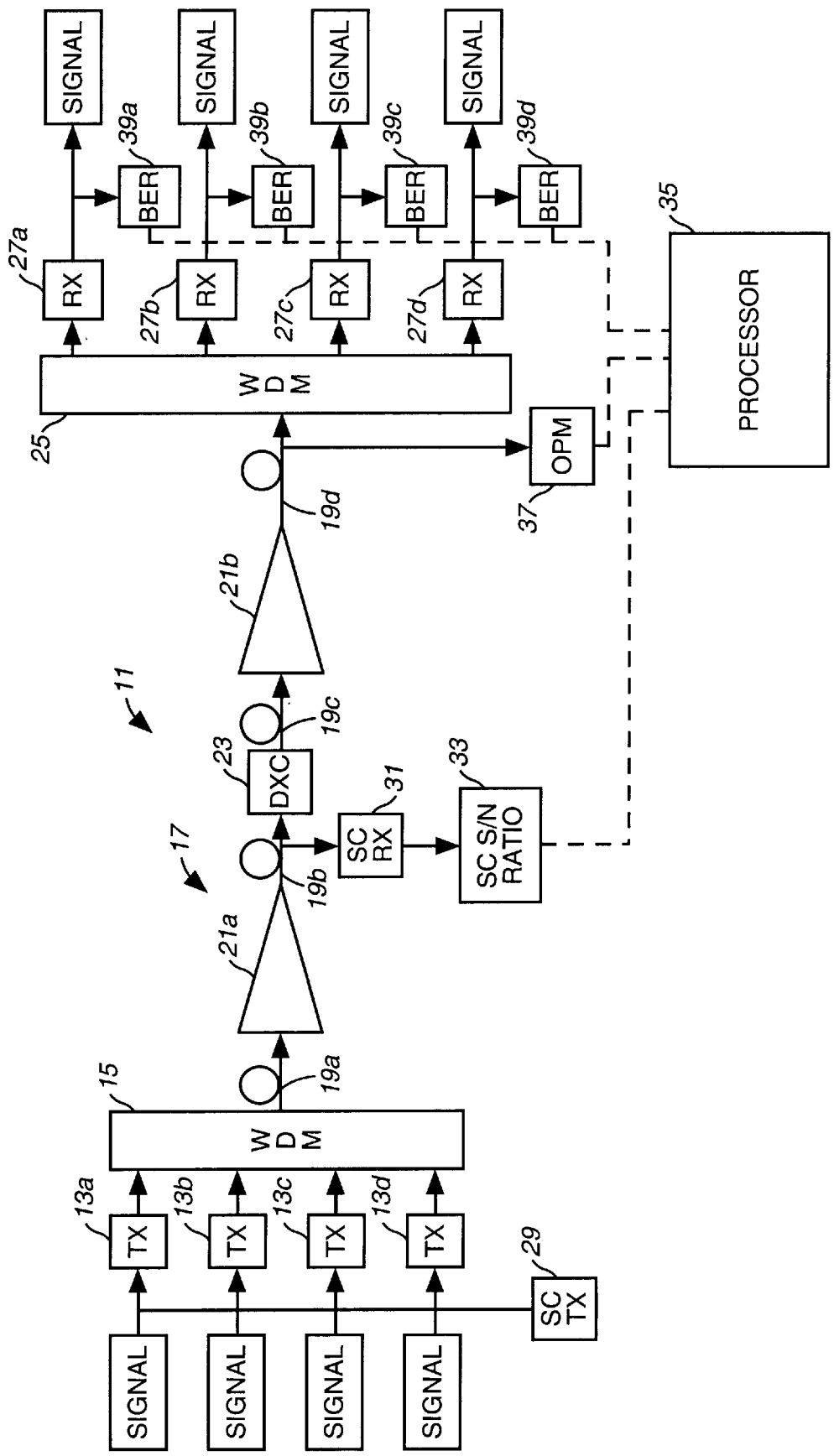
FIG. 1 is a block diagram of an optical communications system according to the present invention.

Referring now to the drawings, and first to FIG. 1, an optical system according to the present invention is designated generally by the numeral 11. System 11 includes a plurality of transmitters 13, each of which receives an electrical signal and converts the electrical signal into an optical signal at a particular wavelength. The optical signals are multiplexed by a wavelength division multiplexer 15 onto an optical fiber transmission path, which is designated generally by the numeral 17. Transmission path 17 includes one or more spans 19 of optical fiber. Transmission path 17 also includes one or more optical amplifiers 21, which in the preferred embodiment are rare earth doped fiber amplifiers. As is well known to those skilled in the art, an optical amplifier includes a length of ion doped glass fiber, an input attenuation and a pump laser. Transmission path 17 may also include one or more digital cross connect devices 23.

The signal transmitted over transmission path 17 is demultiplexed into its wavelength components at a wavelength division multiplexer 25. The individual wavelength components are received at receivers 27, which convert the signal from the optical domain to the electrical domain.

System 11 includes an electrical subcarrier transmitter 29. Subcarrier transmitter 29 outputs a relatively low amplitude, low frequency signal that is coupled to the input of each optical transmitter 13. Subcarrier transmitter 29 thus superimposes a low level, low frequency modulation onto the high bit rate data signal produced by each transmitter 13. The subcarrier may contain a simple tone or it may be encoded with information.

Optical system 11 includes a subcarrier receiver 31 that is optically coupled to optical transmission path 17. In the embodiment of FIG. 1, subcarrier receiver 31 is coupled to optical fiber span 19b before digital cross connect device 23. However, a subcarrier receiver may be coupled at any point along optical transmission path 17. Moreover, more than one subcarrier receiver may be coupled to optical transmission path 17. Subcarrier receiver 31 is a photodiode that produces an electrical signal corresponding to the subcarrier modulation. The output of subcarrier receiver 31 is coupled to a subcarrier signal-to-noise ratio measuring device 33. The output of subcarrier signal-to-noise ratio measuring device 33 is coupled to a processor 35. Subcarrier signal-to-noise ratio measuring device 33 may be coupled to processor 35 either through a separate data link or through optical transmission path 17.

Optical system 11 also includes an optical performance monitor 37 that is optically coupled to optical transmission path 17. In the embodiment of FIG. 1, optical performance monitor 37 is coupled to optical fiber span 19d near wavelength division multiplexer 25. However, an optical performance monitor may be coupled at any point along optical transmission path 17. Additionally, system 11 may include more than one optical performance monitors. Optical performance monitor 37 measures the signal-to-noise ratio of the optical signal. Optical performance monitor 37 is coupled to processor 35, either through a separate data link or through optical transmission path 17.

System 11 includes a bit error rate testing device 39 for each optical channel. In the embodiment of FIG. 1, a bit error rate test device 39 is coupled to the electrical output of each receiver 27. However, a bit error rate tester may be connected at other points in system 11 where an electrical signal is available. For example, a bit error rate tester may be connected to digital cross connect device 23. The output of each bit error rate test device 39 is coupled to processor 35.

Processor 35 monitors the data received from each of subcarrier signal-to-noise ratio test device 33, optical performance monitor 37, and bit error rate test device 39. Processor 35 records the ongoing recent history of each parameter, i.e., subcarrier signal-to-noise ratio, optical signal-to-noise ratio, and optical signal bit error rate, in order to recognize degradation over time. According to the present invention, combinations have observed degradations of the three parameters are interpreted according to a table, which is set forth in detail in FIGS. 2A and 2B.

Referring now to FIGS. 2A and 2B, there is shown a table of failure scenarios that are implied by various combinations of the parameters measured according to the present invention. In FIG. 2A, normal subcarrier signal-to-noise ratio and normal SONET bit error rate combined with the degraded or bad optical signal signal-to-noise ratio implies that the optical performance monitor 37 is faulty or tuned to the wrong wavelength. Normal subcarrier signal-to-noise ratio and normal optical signal signal-to-noise ratio combined with a degraded or bad SONET bit error rate implies that there is an electrical signal failure at a receiver 27.

A normal subcarrier signal-to-noise ratio combined with degraded or bad SONET bit error rate and degraded or bad optical signal signal-to-noise ratio implies several failure scenarios. One possible failure cause is that the pump laser of a an amplifier 21 has degraded. Another possible cause is that other carriers are added to an amplified line. A third possible failure is that a mixing product is robbing amplifier power. A fourth possible failure is that an optical cross connect restoration has occurred. A fifth possible failure is that an amplifier input isolator has increased its attenuation. A sixth possible failure may be due to stimulated raman scattering. A final possible failure implied by a normal subcarrier signal-to-noise ratio combined with degraded or bad sonnet bit error rate and optical signal-to-noise ratio is that one carrier fails in a common subcarrier technique.

Referring to FIG. 2B, a degraded or bad subcarrier signal-to-noise ratio in combination with normal SONET bit error rate and normal optical signal-to-noise ratio implies either a faulty subcarrier transmitter or receiver or the presence of a nonlinear or saturable element in optical transmission path 17. A normal SONET bit error rate in combination with degraded or bad subcarrier signal-to-noise ratio and degraded or bad optical signal-to-noise ratio implies a combined subcarrier and optical performance monitor failure. A normal optical signal-to-noise ratio in combination with degraded or bad subcarrier signal-to-noise ratio and degraded or bad SONET bit error rate implies a combined LTE receiver and subcarrier receiver failure.

Finally, degraded or bad measurements for each of the subcarrier signal-to-noise ratio, sonnet bit error rate, and optical signal signal-to-noise ratio implies any of three failure scenarios. The first scenario implied is that there is a reduction in laser power of a transmitter 13. The second implied scenario is a loss of signal to the input of an amplifier 21. The third possible scenario is operator error by preemphasizing a transmitter.

From the foregoing, it may be seen that the present invention provides a method and system for diagnosing faults or failures in an all optical system. By monitor three performance parameters, a network operator can deduce the cause or possible causes of a failure. The method of the present invention also indicates the presence of faulty test equipment, so that the system operator does not mistakenly take network equipment out of service.

While the present invention has been illustrated and described with reference to a preferred embodiment, those skilled in the art, given the benefit of this disclosure, will recognize that certain features and combinations of features of the invention may be implemented independently of other features. Accordingly, the spirit and scope of the invention may determined with reference to the appended claims.

What is claimed is:

1. A method monitoring performance of an optical communications system, which comprises the steps of:
   measuring sub-carrier signal-to-noise ratio;
   measuring optical signal signal-to-noise ratio;
   measuring optical signal bit error rate; and,
   diagnosing a system component failure based upon measured sub-carrier signal-to-noise ratio, optical signal signal-to-noise ratio, and optical signal bit error rate.

2. The method as claimed in claim 1, wherein said step of diagnosing a system component failure includes the step of consulting a component failure table.

3. The method as claimed in claim 1, wherein said step of diagnosing a system component failure includes the step of diagnosing an optical signal signal-to-noise ratio test device failure if said optical signal signal-to-noise ratio is degraded and both said subcarrier signal-to-noise ratio and said optical signal bit error rate are normal.

4. The method as claimed in claim 1, wherein said step of diagnosing a system component failure includes the step of diagnosing an optical signal failure at a receiver if said optical signal bit error rate is degraded and both said subcarrier signal-to-noise ratio and said optical signal signal-to-noise ratio are normal.

5. The method as claimed in claim 1, wherein said step of diagnosing a system component failure includes the step of diagnosing a degraded amplifier pump laser if said subcarrier signal-to-noise ratio is normal and both said optical signal signal-to-noise ratio and said optical signal bit error rate are degraded.

6. The method as claimed in claim 1, wherein said step of diagnosing a system component failure includes the step of diagnosing a presence of other carriers added to an amplified line if said subcarrier signal-to-noise ratio is normal and both said optical signal signal-to-noise ratio and said optical signal bit error rate are degraded.

7. The method as claimed in claim 1, wherein said step of diagnosing a system component failure includes the step of diagnosing a robbing of amplifier power by the presence of mixing products if said subcarrier signal-to-noise ratio is normal and both said optical signal signal-to-noise ratio and said optical signal bit error rate are degraded.

8. The method as claimed in claim 1, wherein said step of diagnosing a system component failure includes the step of diagnosing an optical cross-connect restoration if said subcarrier signal-to-noise ratio is normal and both said optical signal signal-to-noise ratio and said optical signal bit error rate are degraded.

9. The method as claimed in claim 1, wherein said step of diagnosing a system component failure includes the step of diagnosing an increase in amplifier input isolator attenuation if said subcarrier signal-to-noise ratio is normal and both said optical signal signal-to-noise ratio and said optical signal bit error rate are degraded.

10. The method as claimed in claim 1, wherein said step of diagnosing a system component failure includes the step of diagnosing a presence of stimulated Raman scattering if said subcarrier signal-to-noise ratio is normal and both said optical signal signal-to-noise ratio and said optical signal bit error rate are degraded.

11. The method as claimed in claim 1, wherein said step of diagnosing a system component failure includes the step of diagnosing a failure of a carrier in a common subcarrier technique if said subcarrier signal-to-noise ratio is normal and both said optical signal signal-to-noise ratio and said optical signal bit error rate are degraded.

12. The method as claimed in claim 1, wherein said step of diagnosing a system component failure includes the step of diagnosing a faulty subcarrier transmitter if said subcarrier signal-to-noise ratio is degraded and both said optical signal signal-to-noise ratio and said optical signal bit error rate are normal.

13. The method as claimed in claim 1, wherein said step of diagnosing a system component failure includes the step of diagnosing a faulty subcarrier receiver if said subcarrier signal-to-noise ratio is degraded and both said optical signal signal-to-noise ratio and said optical signal bit error rate are normal.

14. The method as claimed in claim 1, wherein said step of diagnosing a system component failure includes the step of diagnosing a presence of a non-linear element if said subcarrier signal-to-noise ratio is degraded and both said optical signal signal-to-noise ratio and said optical signal bit error rate are normal.

15. The method as claimed in claim 1, wherein said step of diagnosing a system component failure includes the step of diagnosing a presence of a saturable element if said subcarrier signal-to-noise ratio is degraded and both said optical signal signal-to-noise ratio and said optical signal bit error rate are normal.

16. The method as claimed in claim 1, wherein said step of diagnosing a system component failure includes the step of diagnosing a combined subcarrier and optical signal signal-to-noise ratio test device failure if said optical signal bit error rate is normal and both said optical signal signal-to-noise ratio and said subcarrier signal-to-noise ratio are degraded.

17. The method as claimed in claim 1, wherein said step of diagnosing a system component failure includes the step of diagnosing a combined optical signal receiver and subcarrier receiver if said optical signal signal-to-noise ratio is normal and both said subcarrier signal-to-noise ratio and said optical signal bit error rate are degraded.

18. The method as claimed in claim 1, wherein said step of diagnosing a system component failure includes the step of diagnosing a reduction in transmitter laser power if said subcarrier signal-to-noise ratio, said optical signal signal-to-noise ratio, and said optical signal bit error rate are all degraded.

19. The method as claimed in claim 1, wherein said step of diagnosing a system component failure includes the step of diagnosing a loss of signal at an amplifier input if said subcarrier signal-to-noise ratio, said optical signal signal-to-noise ratio, and said optical signal bit error rate are all degraded.

20. The method as claimed in claim 1, wherein said step of diagnosing a system component failure includes the step of diagnosing an operator error by pre-emphasizing a transmitter if said subcarrier signal-to-noise ratio, said optical signal signal-to-noise ratio, and said optical signal bit error rate are all degraded.

* * * * *